United States Patent [19]

Rasshofer et al.

[11] Patent Number: 4,578,500

[45] Date of Patent: Mar. 25, 1986

[54] POLYAMINES AND A PROCESS FOR THEIR PRODUCTION

[75] Inventors: Werner Rasshofer, Cologne; Gerhard Ballé, Leverkusen, both of Fed. Rep. of Germany

[73] Assignee: Bayer Aktiengesellschaft, Leverkusen, Fed. Rep. of Germany

[21] Appl. No.: 553,722

[22] Filed: Nov. 21, 1983

[30] Foreign Application Priority Data

Dec. 4, 1982 [DE] Fed. Rep. of Germany ....... 3244912

[51] Int. Cl.$^4$ .................... C07C 87/50; C07C 125/06; C07C 85/20
[52] U.S. Cl. ...................................... 560/25; 560/26; 560/360; 564/393; 549/292
[58] Field of Search .................... 549/292; 260/463; 560/25, 26; 564/393

[56] References Cited

U.S. PATENT DOCUMENTS

| | | | |
|---|---|---|---|
| 2,888,439 | 5/1959 | Simons | 560/26 X |
| 2,888,440 | 5/1959 | Frazer et al. | 560/26 X |
| 3,398,106 | 8/1968 | Hostettler et al. | 560/26 X |
| 4,386,218 | 5/1983 | Rasshofer et al. | 564/38 |

FOREIGN PATENT DOCUMENTS 2948419 8/1981 Fed. Rep. of Germany.

OTHER PUBLICATIONS

Naegeli et al, (I) Helv. Chim. Acta., vol. 21 (1938) 1100–1126.
Naegeli et al, (II) Chem. Abs., vol. 33 (1939) 539.
N. V. Sidgwick, The Organic Chemistry of Nitrogen, Clarendon Press, Oxford, p. 326 (1966).
J. March, Advanced Organic Chemistry: Reactions, Mechanisms and Structure, McGraw-Hill Book Co., New York, p. 658 (1968).
Organic Syntheses, Coll., vol. IV, 819 (1963).
E. Mohr, J. Prakt. Chem., 71, 133 (1905).
C. Naegeli et al, Helv. Chim. Acta., 21, 1100 (1938).

*Primary Examiner*—Bernard Helfin
*Attorney, Agent, or Firm*—Gene Harsh; Joseph C. Gil; Whalen, Lyndanne M.

[57] ABSTRACT

Compounds containing from 0.15 to 20.3 wt. % aromatic amino groups are produced by hydrolyzing an isocyanate compound mixed with water and a solvent or solvent mixture at −20° to 185° C. The isocyanate starting material must contain at least two aromatically bound isocyanate groups and an isocyanate content of from 0.5 to 40 wt. %. The water must be used in at least a stoichiometric amount but is preferably used in excess. The solvent or solvent mixture must contain 50–100 wt. % solvent containing ether and/or thioether bonds. A partly water-soluble solvent may be used in an amount no greater than 50 wt. % total solvent. No acidic or basic catalysts are present during the hydrolysis. The product amine may be isolated by phase separation, filtration or extraction. The amines thus-produced are particularly useful in the production of polyurethane(urea)s.

12 Claims, No Drawings

POLYAMINES AND A PROCESS FOR THEIR PRODUCTION

BACKGROUND OF THE INVENTION

This invention relates to a single-stage process for the production of polyamines preferably containing urethane groups and, optionally, other groups commonly encountered in isocyanate chemistry. The present invention also relates to polyamines produced by this process.

Polyamines containing urethane groups are known. Processes for the production of such polyamines are described in detail in DE-A Nos. 2,948,419 and 3,039,600 and the prior art discussed therein. It is also known that isocyanates can be converted into amines using acidic or basic catalysts. See, for example, N. V. Sidgwick, The Organic Chemistry of Nitrogen, Clarendon Press, Oxford, page 326 (1966) and also J. March, Advanced Organic Chemistry: Reactions, Mechanisms and Structure, McGraw-Hill Book Co., New York, page 658 (1968). However, Sidgwick refers to the alkaline hydrolyzability of NCO-groups in general rather than specific terms. J. March refers generally to the fact that the hydrolysis of isocyanates and isothiocyanates to amines can be catalyzed by acids and bases.

Those skilled in the art are also familiar with intermediates of isocyanates produced for example in the so-called Curtius or Lossen degradation of acid azides and hydroxamic acids and their decomposition with aqueous acid into amine salts. One such procecure is described in Organic Syntheses, Coll. Vol. IV, 819 (1963) with respect to the production of putrescine hydrochloride.

E. Mohr, J. Prakt. Chem., 71, 133 (1905) discloses that at low temperatures, phenyl isocyanate is affected more quickly by dilute sodium hydroxide than by water. C. Naegeli et al, Helv. Chim. Acta. 21, 1100 (1938) teaches that the hydrolysis of phenyl isocyanates substituted by electron acceptors (such as nitro groups, halogen atoms or acyl groups) in moist ether or in acetone containing 1% of water (i.e., in the absence of acids or bases) gives the corresponding monoamines in a reaction lasting from a few minutes to as long as 1 hour. From 2,4-dinitrophenyl isocyanate, the amine was said to be obtained in a yield of almost 100% in hot water, even in the absence of a solvent, without any urea-forming secondary reactions.

SUMMARY OF THE INVENTION

It is an object of the present invention to provide a single stage process for the production of compounds containing aromatic amino groups.

It is also an object of the present invention to provide novel compounds containing aromatic amino groups.

It is another object of the present invention to provide an inexpensive and environmentally safe process for the production of aromatic amino compounds in which no catalyst is required.

These and other objects which will be apparent to those skilled in the art are accomplished by hydrolyzing a compound containing at least two aromatically bound isocyanate groups and having an isocyanate content of from 0.5 to 40 wt % mixed with water and a solvent or solvent mixture at $-20°$ to $185°$ C. Water is used in at least the stoichiometric amount. The solvent or solvent mixture must be from 50–100 wt % of a solvent containing only ether and/or acyclicether and/or thioether bonds. A solvent which is at least partly water soluble may optionally be used in the solvent mixture in an amount of 0–50 wt % of the total solvent mixture. No acidic or basic catalyst is used during the hydrolysis. When the hydrolysis is completed, the product amine may be isolated by phase separation, filtration or extraction using water insoluble solvents.

DETAILED DESCRIPTION OF THE INVENTION

It is surprising that amine-containing products can be obtained from corresponding preliminary stages by non-catalyzed hydrolysis even in cases where compounds containing 2 or more isocyanate groups (modified polyisocyanates or NCO-prepolymers) are used as starting products. This is surprising because it had been expected of the polyfunctional isocyanates that each $NH_2$-group formed (even in very dilute form) would react with a fresh NCO-group to form a polyurea, particularly where NCO-compounds unsubstituted by an electron-attracting group in the aromatic nucleus are used.

In the process of the present invention, however, products having a remarkably high amine content are obtained (even without heavy dilution) if compounds containing aromatic isocyanate groups and, preferably urethane groups and, optionally, other groups of the type normally present in modified polyisocyanates are hydrolyzed. The groups normally present in modified polyisocyanates are, for example, urethane groups, urea groups, amide groups, biuret groups, uret dione groups, isocyanurate groups, allophanate groups and other groups of the type formed in NCO-prepolymers from (optionally modified) polyisocyanates and the usual low molecular weight and/or relatively high molecular weight polyhydroxyl (or polyamino) compounds such as polyhydroxy polyesters, polyethers, polythioethers, polyacetals or polycarbonates. The modified polyisocyanates or NCO-prepolymers used as starting materials contain at least two isocyanate groups and have an NCO-content of from 0.5 to 40 wt %. These isocyanate compounds are hydrolyzed with at least stoichiometric (preferably excess) quantities of water using water-soluble solvents containing ether and/or thioether bonds and, optionally, small quantities of other at least partly water-soluble solvents. The hydrolysis is conducted in the absence of solid, liquid, dissolved, undissolved, inorganic or organic, basic or acidic catalysts.

More specifically, the present invention relates to a process for the production of compounds containing aromatic amino groups and, preferably, urethane groups and/or optionally other groups of the type encountered in isocyanate chemistry by the hydrolysis of modified polyisocyanates containing at least two aromatically bound NCO-groups and, preferably, urethane groups and/or optionally other groups of the type encountered in isocyanate chemistry or NCO-prepolymers having an NCO-content of from 0.5 to 40 wt % and preferably from 1.2 to 25 wt %. The polyfunctional aromatic NCO-compounds are mixed with water in a quantity at least equivalent to the quantity of NCO-groups and a solvent or solvent mixture of from 50 to 100 wt % of solvent containing aliphatic, cyclic and/or acyclic ether and/or thioether bonds and less than 50 wt % (preferably from 10 to 40 wt %) of other, at least partly water-soluble solvents. The hydrolysis is conducted at a temperature of from $-20°$ to $185°$ C. and preferably 50° to 165° C. Optionally after the solvents and the water have been distilled off, the amine may be isolated from the hydrolysis mixture as residue or by phase separation, filtration or by extraction with water-insoluble solvents.

The present invention also relates to the polyamines obtained by the process of the present invention. These polyamines contain from 0.1 to 20.3 wt %, preferably from 0.15 to 10 wt % and, more preferably, from 0.2 to 2 wt % of aromatically bound amino groups.

Suitable modified polyisocyanates include polyisocyanates which have been modified with substoichiometric quantities of di- and/or polyols, water or aminoalcohols or those which have been biuretized, trimerized or allophanated. Compounds preferably used in the process of the present invention are diisocyanates such as those based on diphenylmethane-4,4'- and/or -2,4'-diisocyanates or tolylene diisocyanates, which have been modified with substoichiometric quantities of polyhydric low molecular weight polyols in an NCO-:OH-ratio of from 2:1 to 4:1.

However, it is particularly preferred to use NCO-prepolymers based on relatively high molecular weight aromatic diisocyanates and compounds having molecular weights of from 400 to about 12,000 (preferably from 500 to 6500) and containing at least 2 (preferably from 2 to 4) hydroxyl, amino or mercapto groups (preferably hydroxyl groups). Examples of such compounds are relatively high molecular weight polyethers, polythioethers, polyacetals, polyesters, polylactones, polycarbonates, mixtures and combinations (for example polyether esters) thereof. Chain-extending agents, such as low molecular weight diols or polyols and other compounds known as chain-extending agents having molecular weights in the range from 62 to 399 (preferably from 62 to 250) may also be used in modifying quantities in the formation of the NCO-prepolymer. Specific examples of such chain extenders are 1,4-, 1,3- and/or 2,3-butane diol, diethylene glycol, neopentyl glycol or 1,2-propylene glycol.

Suitable aromatic polyisocyanates are known compounds such as tolylene-2,4- and/or -2,6-diisocyanates, diphenylmethane-2,4'-, -4,4'- and/or -2,2'-diisocyanates and their mono- to tetra-$C_1$-$C_4$-alkyl derivatives.

Both the relatively high molecular weight polyhydroxyl compounds (preferably polyethers) and the polyisocyanates are described in detail in DE-A Nos. 2,948,449 and 3,039,600 and the publications cited therein. NCO-prepolymers may be produced in known manner by reacting the reactants either in the melt or in solution. In either case, the equivalent ratio of NCO-groups to groups containing active hydrogen atoms (preferably OH-groups) is $\geq 1$, generally in the range from 1.5:1 to 2.8:1 and, more particularly, in the range from 1.5:1 to 2:1. It is of course also possible to use an even larger excess of polyisocyanates.

The NCO-prepolymers ("NCO-preadducts") generally have an oily to wax-like consistency, depending upon the starting components used. If the NCO:OH-ratio is greater than 2, non-extended NCO-preadducts in addition to free diisocyanate ("semiprepolymers") are primarily obtained. NCO:OH ratios below 2:1 result in an increase in the average molecular weight of the NCO-preadducts. If the NCO-prepolymers obtained are subjected to distillation, particularly in a thin-layer evaporator, products containing very little, if any, monomeric diamine are obtained in the process of the present invention.

The NCO-content of the NCO-prepolymers used in the process of the present invention is generally greater than 0.5 wt %, preferably greater than 1.2 wt % and, most preferably, greater than 1.5 wt %. The upper NCO-content limit lies at approximately 30 wt %, preferably 25 wt % and, most preferably, 15 wt %. However, so-called semiprepolymers, (i.e., mixtures of NCO-prepolymers with other free polyisocyanates) which may have an even higher NCO-content, for example of up to 40 wt %, may also be used. The aromatic NCO-groups are preferably attached to a phenylene or diphenylmethane structure which may optionally have one or more $C_1$-$C_4$-alkyl substituents.

In the hydrolysis of NCO-compounds, the quantity of water used should amount to at least one mole of water for each mole of NCO-groups. The water is preferably used in more than 5 times and, most preferably, in more than 10 times the stoichiometric quantity. The proportion of water may, of course, be even higher.

Suitable solvents for the process of the present invention are aliphatic, acyclic or cyclic ether and/or thioether compounds which, apart from the ether and/or thioether bonds, contain only C-C-single or multiple bonds or C-H-bonds. Specific examples of appropriate solvents are dimethoxy ethane, diethoxy ethane, diethylene glycol dimethyl ether, diethylene glycol diethyl ether, diethylene glycol monomethyl mono-t-butylether, triethylene glycol dimethyl ether, ethylene glycol methyl-t-butylether, dipropylene glycol dimethylether, tetrahydrofuran, 2,5-dimethyl tetrahydrofuran, 1,4-dioxane, 1,4-dithiane; and cyclic ethylene or propylene oxide oligomers, such as 1,4,7,10-tetraoxacyclododecane, 1,4,7,10,13-pentaoxacyclopentadecane and 1,4,7,10,13,16-hexaoxacyclooctadecane. Ether compounds containing aromatic and/or aliphatic-aromatic ether bonds, such as dibenzo-[18]-crown-6 or bis-(2-methoxyphenyl)-1,3,5,8,11-pentaoxaundecane, are less preferred, particularly for reasons of cost and because the melting points of some of them are too high. Consequently, they should be used in limited quantities, if at all.

In addition to the water-soluble ether solvents, other solvents which are only partly water-soluble may be used in quantities less than 50 wt. % based on the solvent as a whole. Examples of such solvents are those containing polar groups, such as keto, nitrile, carboxylic acid-N,N-dialkylamide and urea groups. Suitable classes of solvents such as these include: water-soluble aliphatic or cycloaliphatic acid amides containing from 1 to 10 carbon atoms such as dimethyl formamide, diethyl formamide, N-methyl pyrrolidone, dimethylacetamide, caprolactam, formamide (preferably, dimethyl formamide, dimethyl acetamide and N-methyl pyrrolidone); water-soluble, tetra-alkylated aliphatic ureas containing from 4 to 12 carbon atoms such as tetramethyl urea or tetraethyl urea; water-soluble, aliphatic or cycloaliphatic sulfones or sulfoxides containing from 2 to 10 carbon atoms such as tetramethylene sulfone or dimethyl sulfoxides; water-soluble, aliphatic or cycloaliphatic phosphoric acid amides such as hexamethyl phosphoric acid triamide; acetonitrile and propionitrile; and water-soluble ketones such as acetone, or partly water-soluble ketones such as methylethyl ketone (MEK). These solvents may also be used in admixture with one another in any ratio. Of the solvents mentioned, it is preferred to use those which have boiling points under normal pressure below 250° C. and preferably in the range from 64° to 165° C., because this simplifies working up.

Preferred water-miscible solvents are dimethyl formamide, N-methyl pyrrolidone, tetramethylene sulfone, acetonitrile, acetone and methylethyl ketone. Particularly suitable and readily available water-miscible solvents are dimethyl formamide, acetonitrile and acetone. The Zerewitinoff-active substances, such as caprolactam or formamide are less preferred. Although possible, particularly where the process is carried out continuously, it is generally less preferred to use monohydric alkanols or monohydric phenols such as propanol, t-butanol, glycol monoethyl ether or phenol (even in small quantities) as solvents.

Solvents which are not completely miscible or only slightly miscible with water, for example dichloromethane, chloroform, ethylacetate or aliphatic or aromatic hydrocarbons, such as n-hexane or toluene, may be used in small quantities to facilitate the phase separation at room temperature of two-phase reaction mixtures.

The quantity of solvent used in the process of the present invention is preferably such that for every 100 parts of NCO-compound, at least 10, preferably at least 20 and, most preferably, at least 40 parts of solvent are used in the hydrolysis reaction mixture. Water and solvent should generally be used in a quantity such that a substantially homogeneous (at most slightly clouded) or, preferably, a completely homogeneous, clear solution containing the NCO-compound and water is formed at the reaction temperatures. To hydrolyze the NCO-compound to form polyamines having a sufficiently high amine number (high conversion rate), it is of advantage to maintain a concentration of the NCO-compound at no more than 80, preferably no more than 65 wt % of the reaction mixture. Generally, the higher the degree of dilution is during the reaction, the higher the conversion rate of the hydrolysis reaction (i.e., the higher the amine number of the polyamine or, in other words, the greater the conversion of the NCO-groups into the $NH_2$-groups). In practice, the degree of dilution is limited by the economics of working-up, the practical limit lying at around 5% solution. However, the conversion rates are not directly analogous to the degree of dilution.

It is best to use at least enough solvent during the NCO-hydrolysis reaction to maintain a substantially homogeneous and preferably completely homogeneous reaction mixture.

In the process of the present invention, a secondary reaction which occurs is pre-extension. That is, isocyanate and already-formed amine react with chain attachment to form ureas. This secondary reaction may be largely suppressed by working in dilute solution and by maintaining relatively high reaction temperatures, for example in the range from 80° to 100° C. Although it is desirable that secondary reactions such as these should take place to the least possible extent, a certain degree of pre-extension can be tolerated for economic reasons.

The hydrolysis reaction of the present invention is preferably carried out in homogeneous phase. Slight overdosing of the water or of the NCO-compound may result in slight clouding of the reaction mixture because the starting materials are no longer completely dissolved. However, totally inadequate products are obtained if the hydrolysis reaction is carried out in highly heterogeneous phase because addition of a large excess of water causes precipitation of the NCO-prepolymer. The optimum mixing ratios depend upon the particular starting compounds but they may readily be determined by a few preliminary tests.

The reaction may be carried out at temperatures below 185° C., for example at temperatures in the range from 50° to 165° C. However, the reaction is preferably carried out at temperatures in the range from 80° to 100° C. because the best volume/time yields, high solubility and, surprisingly, only relatively slight urea extension are obtained at temperatures in that range. It is particularly preferred to carry out the reaction at the boiling point of the mixture which, due to the presence of water, is generally in the range from about 90° to 100° C. Under certain conditions, it may be necessary to carry out the reaction under pressure to obtain sufficiently high temperatures.

The onset of the reaction is indicated by the almost spontaneous evolution of $CO_2$ which can be observed even at low temperatures (e.g., 20° C.). However, it is preferred that the reaction be carried out at the higher temperatures indicated above in order to suppress urea formation. It is important for the reactants to be mixed very thoroughly and rapidly to form a homogeneous solution. Use of solvents facilitates this mixing as does the reduction in viscosity which occurs at the higher reaction temperatures. The reaction may be carried out continuously or in batches.

In one batch-type embodiment, the compound containing NCO-groups is introduced into the mixture containing water and solvent. This may be done by means of a dropping funnel or by injection using a nozzle. Thorough dispersion is achieved by intensive stirring.

It is also possible to introduce the compound containing NCO-groups (preferably at 20° to 80° C.) and then add the solvent/water mixture before carrying out the reaction at, for example, 50° to 150° C. Alternatively, when addition of the reactants made at a low temperature (for example in the range from −10° to +15° C.) is complete, the reaction mixture may be slowly heated to higher temperatures.

In a continuous embodiment, which is particularly suitable for working on an industrial scale, the NCO-compounds (optionally in the form of a solution) and the aqueous solution are separately delivered to a common reaction zone, intensively mixed (for example by means of a flow mixer) and reacted and then rapidly discharged from the mixing zone. Metering may be carried out, for example, by means of graduated dropping funnels or by means of a piston and/or diaphragm metering pump or by means of any other mechanical metering unit. Where metering is carried out continuously, it is preferred to mix and react both components very quickly (in seconds or fractions of a second) using a suitable, optionally mechanically operated unit and to discharge the reaction mixture from the reaction zone.

Various additives may be used to facilitate the reaction of the isocyanate groups with the aqueous solvent phase. For example, one or more standard commercial emulsifiers may be added in quantities of from 0.01 to 1 part by weight per 100 parts of reaction mixture to promote homogenization. However, there is no need to add an emulsifier where homogeneous reaction mixtures (dissolved NCO-compound) are used.

After mixing, the mixture may be worked up directly to form the polyamine, optionally after a short after-reacton time of generally less than 5 minutes. When such a short after-reaction is used, the reaction mixture may be heated under gentle reflux, preferably at normal pressure, to separate off as much of the carbon dioxide formed as possible. However, the reaction mixture may also be kept at elevated temperature for longer periods without any disadvantages. It is particularly preferred to work up the reaction mixture immediately after the mixing operation.

Working up may also be carried out continuously or in batches. The reaction mixture is usually worked up by distillation, extraction or by phase separation or by a combination of these methods. The volatile constituents are distilled off, optionally under reduced pressure. In general, sump temperatures (in the residual polyamine) of from 100° to about 130° C. are maintained towards the end of concentration by evaporation. The residual polyamine may be used directly as starting material in the production of, for example, poly(urethane)ureas.

Extraction processes, optionally after dilution with water, may be carried out with water-insoluble solvents, such as methylene chloride or chlorobenzene. Extraction processes are not preferred, however.

Phase separation of the reaction mixture by cooling occurs in some cases where hydrolysis has been carried out at relatively high temperatures and in the presence of a relatively large amount of water at the limit of solubility. Phase separation may be improved or actually brought about by the addition of water or preferably by the addition of water-soluble or only slightly water-soluble solvents such as methyl ethyl ketone or ethyl acetate. The aqueous phase optionally containing solvent is separated off from the polyamine phase. In most cases, the aqueous phase may be directly re-used.

In addition to the polyamine, the polyamine phase contains a little water and solvent which are removed as completely as possible by distillation, optionally in vacuo, or by thin-layer distillation.

The polyamines obtained in accordance with the present invention after working up are generally colorless to faintly colored, medium-viscous to highly viscous and, optionally, relatively high melting products having amino group contents of from 0.1 to 20.3 wt. %. Depending upon the starting materials, the product polyamines may also contain urethane and/or urea and/or amide and/or uret dione and/or isocyanurate and/or allophanate and/or biuret groups and, optionally, ether and/or acetal and/or carbonate and/or ester and/or thioether and/or dialkyl siloxane groups and/or the residues of polybutadienes which may already have been present in the NCO-compounds. However, additional bonds may be formed through secondary reactions. For example, urea groups may be formed during the hydrolysis reaction from fractions which have already been hydrolyzed to form $NH_2$-groups and residual NCO-groups.

The quantity of primary aromatic amino groups present in the polyamines corresponds at most to the quantity of NCO-groups in the NCO-compounds, i.e. approximately 0.10 to 20.3 wt. % of $NH_2$, preferably 0.15 to 10 wt. % of $NH_2$ and, most preferably, 0.20 to 2.0 wt. % of $NH_2$.

NCO-groups attached to aliphatic radicals yield highly reactive aliphatic amines as hydrolysis products which amines react very quickly with NCO-groups still present to form urea compounds. The polyurea amines thus-formed have a relatively high molecular weight and, in some cases, a low $NH_2$-content.

By virtue of their low vapor pressure, the aromatic polyamines obtained by the process of the present invention are particularly useful as reactants for optionally blocked polyisocyanates in the production of polyurethanes (polyurethane ureas), polyurethane plastics and polyurethane foams. These amines may even be combined with other low molecular weight compounds (molecular weight 32 to 399) and/or relatively high molecular weight compounds (molecular weight 400 to approx. 12,000) containing isocyanate-reactive groups to produce such polyurethanes. Suitable starting components for the production of polyurethane plastics were described above with respect to production of the prepolymers useful in the present invention. Appropriate materials for the production of polyurethanes are also described in DE-A Nos. 2,302,564; 2,432,764 (U.S. Pat. No. 3,903,679); 2,639,083; 2,512,385; 2,513,815; 2,550,796; 2,550,797; 2,550,833; 2,550,860; 2,550,862 and 3,039,600. These publications also contain information on auxiliaries and additives which may optionally be used in the production of polyurethanes.

The present invention also relates to the production of polyurethane(urea)s using the polyamines produced in accordance with the invention. These polyurethane(urea)s may be used for homogeneous or foamed elastomers, coatings, filaments or moldings by application from melts, solutions, dispersions or as a mixture of reactive components. Methods for producing such materials by the polyisocyanate polyaddition reaction are known to those skilled in the art. The polyamines produced in accordance with the present invention may also be used as coupling components for diazo dyes, as hardeners for epoxide and phenolic resins and in any other known reactions involving amines, such as amide- or imide-forming reactions and others.

The process of the present invention is illustrated by the following Examples in which the quantities given represent parts by weight and percentages by weight, unless otherwise indicated.

EXAMPLES

The following compounds containing NCO-groups were used in the Examples:

Prepolymer A

Tolylene-2,4-diisocyanate and linear polypropylene glycol (OH number 56) were combined at 20° C. in an NCO:OH ratio of 2:1, followed by heating for 4 hours to 80° C. NCO-content=3.7%.

Prepolymer B

Tolylene-2,4-diisocyanate and linear polypropylene glycol (OH number 112) were combined at 20° C. in an NCO:OH-ratio of 2:1, followed by heating for 4 hours to 80° C. NCO-content=7.2%.

Prepolymer C

Tolylene-2,4diisocyanate and a linear 1,2-propane diol-started polyether (80 wt. % polypropylene oxide block and 20 wt. % terminal polyethylene oxide block) having an OH-number 28 were combined at 20° C. in an NCO:OH-ratio of 2:1, followed by heating first for 3 hours to 70° C. and then for 2 hours to 80° C. NCO-content=1.9%.

Prepolymer D

A mixture of 60 wt. % 4,4'-diisocyanatodiphenyl methane and 40 wt. % 2,4'-isomer was combined with a linear polypropylene glycol (OH number 56) followed by heating for 4 hours to 80° C. NCO-content=3.5%.

Prepolymer E

A mixture of 80 wt. % 2,4-diisocyanatotoluene and 20 wt. % 2,6-diisocyanatotoluene was combined at 20° C. with a trimethylol propane-started polyether triol (containing 78 wt. % polypropylene oxide blocks and 22 wt. % terminal ethylene oxide blocks) having an OH number of 28 in an NCO:OH-ratio of 5:1, and heated for 4 hours to 80° C. The excess tolylene diisocyanate was then distilled off in vacuo by means of a thin-layer evaporator. NCO-content=3.6%.

Prepolymer F

Tolylene-2,4-diisocyanate and a trimethylol propane-started polyether (OH number 35) containing 80 wt. % propylene oxide units and 20 wt. % terminal ethylene oxide units were combined at 20° C. in an NCO:OH-ratio of 2:1 and then heated first for 3 hours to 70° C. and then for 2 hours to 80° C. NCO-content=2.4%.

Prepolymer G

Tolylene-2,4-diisocyanate and a polytetramethylene glycol ether diol (OH number 112) were combined at 30° C. in an NCO:OH ratio of 2:1, followed by heating for 4 hours to 80° C. NCO-content=6.9%.

EXAMPLES 1 TO 18

General Procedure

The mixture of water and solvent in the ratio indicated in Table 1 was initially introduced into the reaction vessel and heated with stirring to the temperature indicated in Table 1. The quantity of isocyanate compound indicated in Table 1, optionally in admixture with one of the solvents indicated in Table 1, was then added dropwise over the prior indicated, with varying amounts of carbon dioxide being given off. The addition time and the stirring time, during which the mixture was continuously stirred, are also indicated in Table 1. The solvent was distilled off at 20 mbar/100° C. and then at 0.1 mbar/100° C. The products were all yellow to dark brown-red, high-viscosity to medium-viscosity products. Their physical properties are also shown in Table 1.

TABLE 1

| | Example No. | | | | | | | | |
|---|---|---|---|---|---|---|---|---|---|
| | 1 | 2 | 3 | 4 | 5 | 6 | 7 | 8 | 9 |
| Prepolymer A (parts) | 100 | 100 | 100 | 100 | 100 | 100 | 100 | 100 | 100 |
| Water (parts) | 50 | 200 | 50 | 50 | 50 | 50 | 50 | 100 | 40 |
| Dioxane (parts) | 300 | 300 | — | — | — | — | — | — | — |
| THF (parts) | — | — | — | — | — | — | — | — | — |
| 2,5-dimethyl-THF (parts) | — | — | — | — | — | — | — | — | — |
| Diglyme (parts) | — | — | 300 | 200 | 200 | 150 | 150 | — | — |
| DME (parts) | — | — | — | — | — | 150 | — | — | — |
| Triglyme (parts) | — | — | — | — | — | — | 150 | 300 | — |
| DEG-methyl-t-butyl ether (parts) | — | — | — | — | — | — | — | — | 400 |
| EG-methyl-t-butyl ether (parts) | — | — | — | — | — | — | — | — | — |
| DEG-diethyl ether (parts) | — | — | — | — | — | — | — | — | — |
| Cosolvent (parts) | — | — | — | 100 DMF | 100 acetone | — | — | — | — |
| Solvent temp. (°C.) | 65 | 65 | 95 | 95 | 95 | 80 | 85 | 95 | 95 |
| Prep. temp. (°C.) | 20 | 20 | 60 | 45 | 30 | 35 | 35 | 40 | 20 |
| Addition time (mins.) | 45 | 45 | 45 | 45 | 30 | 35 | 35 | 45 | 45 |
| Stirring time (mins.) | 5 | 5 | 10 | 10 | 10 | — | — | 5 | 5 |
| Prim. N (%)[1] | 0.48 | 0.41 | 0.54 | 0.52 | 0.56 | 0.50 | 0.62 | 0.68 | 0.49 |
| NH-number (mg of KOH/g)[2] | 19.3 | 16.4 | 21.4 | 20.7 | 22.4 | 20.0 | 24.9 | 27.1 | 19.4 |
| Total-N (%)[3] | 2.46 | 2.50 | 2.54 | 2.48 | 2.61 | 2.56 | 2.60 | 2.62 | 2.50 |

[1] $HClO_4$—titration
[2] Calculated from [1]
[3] Kjeldahl's method
Diglyme = diethylene glycol dimethyl ether
Triglyme = triethylene glycol dimethyl ether
THF = tetrahydrofuran
DME = dimethoxy ethane
DEG = diethylene glycol
EG = ethylene glycol

TABLE 1

| Example No. | 10 | 11 | 12 | 13 | 14 | 15 | 16 | 17 | 18 |
|---|---|---|---|---|---|---|---|---|---|
| Prepolymer A (parts) | 100 | 100 | 100 | 100 | 100 | 100 | 100 | 100 | 100 |
| Water (parts) | 50 | 50 | 40 | 40 | 40 | 40 | 40 | 50 | 50 |
| Dioxane (parts) | — | — | — | — | — | — | — | 100 | — |
| THF (parts) | — | — | — | — | — | — | — | 100 | 250 |
| 2,5-dimethyl-THF (parts) | — | — | — | — | — | — | — | — | 50 |
| Diglyme (parts) | — | — | — | — | 280/120[4] | 240 | 240 | — | — |
| DME (parts) | — | — | — | — | — | 80[4] | — | — | — |
| Triglyme (parts) | — | — | — | — | — | — | — | — | — |
| DEG-methyl-t-butyl ether (parts) | — | — | — | 200 | — | — | — | — | — |
| EG-methyl-t-butyl ether (parts) | 400 | — | — | — | — | — | — | — | — |

TABLE 1-continued

| Example No. | 10 | 11 | 12 | 13 | 14 | 15 | 16 | 17 | 18 |
|---|---|---|---|---|---|---|---|---|---|
| DEG-diethyl ether (parts) | — | 320/80[4] | 320 | — | — | — | — | — | — |
| Cosolvent (parts) | — | — | 100 DMF[4] | 100 DMF[4] | — | — | 100[4] CH$_3$CN | — | — |
| Solvent temp. (°C.) | 95 | 95 | 80 | 80 | 45 | 70 | 75 | 60 | 60 |
| Prep. Temp. (°C.) | 60 | 60 | 20 | 45 | 20 | 20 | 20 | 20 | 20 |
| Addition time (mins.) | 5 | 5 | 30 | 30 | 40 | 60 | 90 | 20 | 20 |
| Stirring time (mins.) | — | — | 5 | — | — | 10 | 5 | 5 | — |
| Prim. N (%)[1] | 0.43 | 0.57 | 0.67 | 0.60 | 0.50 | 0.51 | 0.60 | 0.32 | 0.33 |
| NH—number (mg of KOH/g)[2] | 17.0 | 22.7 | 26.8 | 24.1 | 20.1 | 20.2 | 24.1 | 12.7 | 13.1 |
| Total-N (%)[3] | 2.47 | 2.54 | 2.44 | 2.39 | 2.59 | 2.60 | 2.57 | 2.59 | 2.51 |

[1] HClO$_4$—titration
[2] Calculated from [1]
[3] Kjeldahl's method
[4] For dissolving the NCO—prepolymer

EXAMPLES 19 TO 25

General Procedure

In these Examples, the quantities of solvent and water were varied to obtain an economically more favorable NCO-compound/solvent ratio. The data are set out in Table 2. The procedure was the same as that used in Examples 1 to 18.

TABLE 2

| Example No. | 19 | 20 | 21 | 22 | 23 | 24 | 25 |
|---|---|---|---|---|---|---|---|
| Prepolymer A (parts) | 100 | 100 | 100 | 100 | 100 | 100 | 100 |
| Water (parts) | 40 | 40 | 40 | 40 | 40 | 25 | 10 |
| Dioxane (parts) | 100 | 50 | 50 | — | 25 | 200 | 200 |
| Diglyme (parts) | — | 50 | — | 75 | 50 | — | — |
| Solvent temp. (°C.) | 90 | 90 | 90 | 90 | 90 | 90 | 90 |
| Prep. temp. (°C.) | 45 | 45 | 30 | 25 | 20 | 30 | 60 |
| Addition time (mins.) | 30 | 30 | 30 | 30 | 30 | 30 | 30 |
| Stirring time (mins.) | 5 | 5 | 5 | 5 | — | — | — |
| Prim. N (%)[1] | 0.54 | 0.52 | 0.66 | 0.60 | 0.59 | 0.45 | 0.49 |
| NH—number (mg of KOH/g)[2] | 21.4 | 20.7 | 26.4 | 24.1 | 23.7 | 18.0 | 19.7 |
| Total N (%)[3] | 2.51 | 2.50 | 2.46 | 2.39 | 2.50 | 2.48 | 2.61 |

[1]-[3] Same as in Table 1

EXAMPLES 26 TO 32

General Procedure

In these Examples, the prepolymers used were varied and the solvents used were the same throughout. The procedure was otherwise the same as that used in Examples 1 to 18. The analytical data are set out in Table 3.

TABLE 3

| Example No. | 26 | 27 | 28 | 29 | 30 | 31 | 32 |
|---|---|---|---|---|---|---|---|
| Prepolymer A (parts) | 100 | — | — | — | — | — | — |
| Prepolymer B (parts) | — | 100 | — | — | — | — | — |
| Prepolymer C (parts) | — | — | 100 | — | — | — | — |
| Prepolymer D (parts) | — | — | — | 100 | — | — | — |
| Prepolymer E (parts) | — | — | — | — | 100 | — | — |
| Prepolymer F (parts) | — | — | — | — | — | 100 | — |
| Prepolymer G (parts) | — | — | — | — | — | — | 100 |
| Dioxane (parts) | 300 | 300 | 300 | 300 | 300 | 300 | 300 |
| Water (parts) | 50 | 50 | 50 | 50 | 50 | 50 | 50 |
| Solvent temp. (°C.) | 90 | 90 | 90 | 90 | 90 | 90 | 90 |
| Prep. temp. (°C.) | 35 | 35 | 35 | 60 | 35 | 35 | 35 |
| Addition time (mins.) | 45 | 45 | 45 | 45 | 45 | 45 | 45 |
| Stirring time (mins.) | 10 | 10 | 10 | 25 | 25 | — | — |
| Prim. N (%)[1] | 0.77 | 1.12 | 0.37 | 0.43 | 0.61 | 0.35 | 1.35 |
| NH—number (mg of KOH/g)[2] | 30.8 | 44.8 | 17.3 | 18.0 | 24.4 | 14.0 | 54.0 |
| Total N (%)[3] | 2.51 | 4.48 | 1.35 | 2.20 | 1.34 | 1.62 | 4.60 |

[1]-[3] Same as in Table 1

EXAMPLES 33 TO 40

General Procedure

In these Examples, the NCO-compounds were initially introduced at the temperature indicated in Table 4. The solvent/water mixtures tempered to the temperatures indicated in Table 4 were added with stirring. Carbon dioxide was given off. The addition time and stirring time are also shown in Table 4. The solvent and water were distilled off at 20 mbar/100° C. and then at 0.10 mbar/100° C. The data of the highly viscous amine compounds are also set out in Table 4.

TABLE 4

| Example No. | 33 | 34 | 35 | 36 | 37 | 38 | 39 | 40 |
|---|---|---|---|---|---|---|---|---|
| Prepolymer A (parts) | 100 | 100 | 100 | 100 | — | — | — | — |
| Prepolymer D (parts) | — | — | — | — | 100 | 100 | 100 | 100 |

TABLE 4-continued

| Example No. | 33 | 34 | 35 | 36 | 37 | 38 | 39 | 40 |
|---|---|---|---|---|---|---|---|---|
| Dioxane (parts) | 200 | 200 | — | — | 250 | 200 | — | — |
| THF (parts) | — | — | 50 | 50 | — | 100 | 150 | — |
| Diglyme (parts) | — | — | 50 | 150 | 50 | — | 150 | 300 |
| Water (parts) | 100 | 50 | 40 | 40 | 50 | 50 | 50 | 50 |
| Solvent temp. (°C.) | 75 | 75 | 65 | 50 | 90 | 65 | 50 | 90 |
| Prep. temp. (°C.) | 80 | 80 | 80 | 70 | 90 | 90 | 60 | 45 |
| Addition time (mins.) | 30 | 30 | 30 | 60 | 45 | 60 | 60 | 60 |
| Stirring time (mins.) | 5 | — | — | — | 10 | — | — | — |
| Prim. N (%)[1] | 0.58 | 0.34 | 0.41 | 0.41 | 0.44 | 0.31 | 0.44 | 0.40 |
| NH—number (mg of KOH/g)[2] | 23 | 13.7 | 16.4 | 16.5 | 17.4 | 12.5 | 17.5 | 15.9 |
| Total N (%)[3] | 2.43 | 2.52 | 2.51 | 2.58 | 2.19 | 2.24 | 2.21 | 2.27 |

[1]-[3]as in Table 1

EXAMPLES 41 TO 50

General Procedure

In these Examples, variations of solvent were made as can be seen from Table 5. The procedure was otherwise the same as that used in Examples 1 to 18. The test data and analytical data are set out in Table 5.

TABLE 5

| Example No. | 41 | 42 | 43 | 44 | 45 | 46 | 47 | 48 | 49 | 50 |
|---|---|---|---|---|---|---|---|---|---|---|
| Prepolymer A (parts) | 100 | 100 | 100 | 100 | 100 | 100 | 100 | 100 | 100 | 100 |
| Water (parts) | 35 | 35 | 50 | 50 | 75 | 25 | 100 | 100 | 50 | 50 |
| 1,4-dioxane (parts) | 200 | 100 | — | — | — | — | 150 | 150 | 100 | — |
| 1,4-dithiane (parts) | 100 | 200 | 300 | 500 | 500 | 500 | 150 | 150 | 200 | 200 |
| Co—solvent (parts) | — | — | — | — | — | — | — | — | 100[4] DMF | 100[4] CH₃CN |
| Solvent temp. (°C.) | 95 | 95 | 95 | 95 | 95 | 95 | 80 | 50 | 80 | 80 |
| Prep. temp. (°C.) | 60 | 60 | 60 | 60 | 60 | 60 | 60 | 50 | 30 | 30 |
| Addition time (mins.) | 10 | 10 | 10 | 10 | 10 | 10 | 5 | 5 | 5 | 10 |
| Stirring time (mins.) | 5 | 5 | 5 | 5 | 5 | 5 | 5 | 5 | — | — |
| Prim. N (%)[1] | 0.57 | 0.60 | 0.59 | 0.58 | 0.57 | 0.66 | 0.55 | 0.46 | 0.65 | 0.60 |
| NH—number (mg of KOH/g)[2] | 22.9 | 24.1 | 23.7 | 23.1 | 22.9 | 26.4 | 22.0 | 18.4 | 26.1 | 24.1 |
| Total N (%)[3] | 2.48 | 2.53 | 2.48 | 2.51 | 2.61 | 2.54 | 2.57 | 2.41 | 2.38 | 2.50 |

[1]-[3]Same as in Table 1
[4]Added to the NCO—prepolymer

TABLE 6

| Example No. | 51 | 52 | 53 | 54 | 55 |
|---|---|---|---|---|---|
| Prepolymer A (parts) | 100 | — | — | — | — |
| Prepolymer B (parts) | — | 100 | — | — | — |
| Prepolymer C (parts) | — | — | 100 | — | — |
| Prepolymer D (parts) | — | — | — | 100 | — |
| Prepolymer E (parts) | — | — | — | — | 100 |
| Water (parts) | 30 | 30 | 30 | 30 | 30 |
| Dioxane (parts) | 150 | 150 | 150 | 150 | 150 |
| Diglyme (parts) | 150 | 150 | 150 | 150 | 150 |
| Addition time (mins.) | 40 | 40 | 40 | 40 | 40 |
| Prim. N (%)[1] | 0.48 | 1.0 | 0.46 | 0.48 | 0.65 |
| NH—number (mg of KOH/g)[2] | 19.0 | 40.1 | 18.2 | 19.3 | 26.0 |
| Total N (%)[3] | 2.56 | 4.48 | 1.31 | 2.30 | 1.37 |

[1]-[3]Same as in Table 1

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of compounds containing aromatic amino groups by
   (a) hydrolyzing
   (i) a compound containing at least two aromatically bound isocyanate groups and having an isocyanate content of from 0.5 to 40 wt % mixed with
   (ii) water in at least a stoichiometric amount and
   (iii) a solvent or solvent mixture containing
      (A) 50-100 wt. % solvent containing only carbon-carbon, carbon-hydrogen, ether and/or thioether bonds and
      (B) 0-50 wt. % solvent which is at least partly water-soluble
   at −20° to +185° C. in the absence of an acidic or basic catalyst and
   (b) isolating the product amine.

2. The process of claim 1 in which the compound containing isocyanate groups also contains urethane groups.

3. The process of claim 1 in which the solvent (iii) and water are distilled off before the product amine is isolated.

4. The process of claim 1 in which the product amine is isolated by phase separation, filtration or extraction using water-insoluble solvents.

5. The process of claim 1 in which water is used in at least 10 times the stoichiometric amount.

6. The process of claim 1 in which the solvent (iii) (A) is selected from the group consisting of ethylene glycol dialkyl ethers, diethylene glycol dialkyl ethers, triethylene glycol dialkyl ethers, tetrahydrofurans, 1,4-dioxanes and mixtures thereof.

7. The process of claim 6 in which the solvent (iii) (B) is selected from the group consisting of carboxylic acid-N,N-dialkylamides, lactams, tetraalkyl ureas, sulfones, sulfoxides, phosphoric acid-N,N-dialkylamides, nitriles, ketones and combinations thereof which boil at a temperature below 250° C.

8. The process of claim 1 in which the solvent (iii) (A) is a dimethyl ether of ethylene glycol, diethylene glycol, triethylene glycol, tetrahydrofuran and/or 1,4-dioxane.

9. The process of claim 1 in which the solvent (iii) (B) is selected from the group consisting of carboxylic acid-N,N-dialkylamides, lactams, tetraalkyl ureas, sulfones, sulfoxides, phosphoric acid-N,N-dialkylamides, nitriles, ketones and combinations thereof which boil at a temperature below 250° C.

10. The process of claim 1 in which the hydrolysis is carried out at a temperature of from 50° to 165° C.

11. The process of claim 1 in which the isocyanate compound (i) is an NCO-prepolymer containing from 1.5 to 15 wt. % aromatically bound isocyanate groups based on relatively high molecular weight difunctional to trifunctional polyether polyols.

12. The process of claim 1 in which the aromatically bound NCO-groups of compound (i) are attached to the aromatic ring of a phenylene or diphenylmethane structure.

* * * * *